(12) United States Patent
Shih et al.

(10) Patent No.: US 7,459,211 B2
(45) Date of Patent: Dec. 2, 2008

(54) ANTI-ULTRAVIOLET REFLECTOR

(75) Inventors: Hsi-Hsin Shih, Taichung (TW); Kuo-Lung Wu, Tainan County (TW); Tien-Chieh Chang, Tainan County (TW); Shih-Kai Cheng, Tainan County (TW); Mao-Song Lee, Tainan County (TW)

(73) Assignee: Chi Lin Technology Co., Ltd., Tainan County (TW)

( * ) Notice: Subject to any disclaimer, the term of this patent is extended or adjusted under 35 U.S.C. 154(b) by 202 days.

(21) Appl. No.: 11/463,907

(22) Filed: Aug. 11, 2006

(65) Prior Publication Data

US 2007/0037000 A1 Feb. 15, 2007

(30) Foreign Application Priority Data

Aug. 12, 2005 (TW) ............................. 94127631 A

(51) Int. Cl.
*B32B 27/36* (2006.01)
*B32B 9/04* (2006.01)

(52) U.S. Cl. .................. 428/412; 264/176.1; 264/219; 427/532; 428/411.1; 428/412; 522/99; 522/100; 525/227; 525/244

(58) Field of Classification Search .............. 264/176.1, 264/219; 427/532; 428/411.1, 412; 522/8; 524/99, 100; 525/227, 244; 528/44, 196, 528/198

See application file for complete search history.

(56) References Cited

U.S. PATENT DOCUMENTS

| | | | |
|---|---|---|---|
| 3,660,141 A | 5/1972 | Yoshiyasu et al. | 427/393.5 |
| 3,754,063 A | 8/1973 | Schirmer | 264/456 |
| 4,273,827 A | 6/1981 | Sweeney et al. | 428/316.6 |
| 4,557,980 A | 12/1985 | Hodnett, III | 428/336 |
| 5,137,785 A | 8/1992 | Suzuki et al. | 428/411.1 |
| 5,409,772 A | 4/1995 | Yabusa et al. | 428/335 |
| 6,110,547 A | 8/2000 | Sano et al. | 428/31 |
| 6,191,199 B1 | 2/2001 | Renz et al. | 524/100 |

*Primary Examiner*—Terressa M Boykin
(74) *Attorney, Agent, or Firm*—Thomas, Kayden, Horstemeyer & Risley

(57) ABSTRACT

Disclosed is an anti-UV reflector for distributing a light from a point light source or a linear light uniformly over a target. The anti-UV reflector mainly includes a light reflecting polymeric substrate and a protecting layer of anti-UV material provided on the polycarbonate substrate for reducing yellowing in the polycarbonate substrate. When a light from a point light source or a linear light illuminates the anti-UV reflector, UV radiation in the light is filtered or absorbed by the protecting layer thereby reducing yellowing in the polyearbonate substrate.

9 Claims, No Drawings

ANTI-ULTRAVIOLET REFLECTOR

RELATED APPLICATIONS

The present application is based on, and claims priority from, Taiwan Application Serial Number 94127631, filed Aug. 12, 2005, the disclosure of which is hereby incorporated by reference herein in its entirety.

FIELD OF THE INVENTION

This invention relates generally to an anti-ultraviolet (anti-UV) article, and more particularly, to an anti-UV polymeric reflector.

BACKGROUND OF THE INVENTION

Most polymeric articles, for example, polycarbonate sheets, suffer the problem of yellowing under UV irradiation for a long term, resulting in lowering the transparency or loss of shine.

The conventional illuminating device, for example, the backlight module of the liquid crystal display (LCD), typically has a light-reflecting device for reflecting a point light source or a linear light source to the object (e.g. the panel of LCD).

The reflector made of polymer (e.g. polycarbonate) has been disclosed. However, polycarbonate is very sensitive to UV irradiation. As the polycarbonate reflector is exposed under the cold cathode fluorescent lamp (CCFL) of the backlight module, it is easily yellowed due to exposure under UV irradiation radiated from CCFL, and its aging phenomenon is proceeded acceleratively, as a result of considerably lowering its reflectivity.

SUMMARY OF THE INVENTION

Accordingly, an aspect of the present invention provides an anti-UV reflector, which can overcome or at least improve the yellowing issue existed in the aforementioned prior art.

According to the aforementioned aspect of the present invention, the anti-UV reflector is provided, which mainly includes: a light-reflecting polymeric substrate and a protection layer disposed thereon. Since the protection layer can absorb UV irradiation, the UV induced damage can be considerably eliminated, so as to effectively reduce yellowing of the polymeric substrate. In addition, the protection layer can absorb UV irradiation but not be yellowed, so the reflectivity of the anti-UV reflector would not be lowered.

In a preferred embodiment of the present invention, the aforementioned light-reflecting polymeric substrate may have inorganic compound particles added therein for further enhancing its reflectivity. Moreover, the protection layer may also have inorganic compound particles added therein for further enhancing its reflectivity. Appropriate inorganic compound may be, for example, titanium dioxide, calcium carbonate, barium sulfate, magnesium oxide, zinc oxide or mixtures thereof.

In a preferred embodiment of the present invention, the aforementioned protection layer may be made of a material of polypropylene, acrylic resin [e.g. poly(methyl methacrylate); PMMA], polyester, or resin-based coating, for example, fluorocarbon resin, silicone resin, acrylic resin, alkyd resin, polyurethane (PU) resin, epoxy resin, unsaturated polyester resin or mixtures thereof.

In a preferred embodiment of the present invention, the aforementioned protection layer may further have an anti-UV ingredient added therein. Appropriate anti-UV ingredient may be an UV absorbing agent, for example, benzotriazole (BTA), benzophenone, cyanoacrylate, amino-type compound, hindered amino-type compound, salicyl-type compound, nickel complex or mixtures thereof.

DETAILED DESCRIPTION OF THE PREFERRED EMBODIMENT

The present invention provides an anti-UV reflector, which mainly includes: a light-reflecting polymeric substrate and a protection layer disposed thereon. Since the protection layer can absorb UV irradiation, the UV induced damage can be considerably eliminated, so as to effectively reduce yellowing of the polymeric substrate. In addition, the protection layer can absorb UV irradiation for preventing the polymeric substrate from being yellowed, so the reflectivity of the anti-UV reflector would not be lowered. The light-reflecting polymeric substrate suitably applied in the present invention includes but is not limited by polycarbonate substrate, which is added with inorganic compound particles or has the surface of prismatic or lenticular microstructures.

The protection layer may be made of a material of polypropylene, acrylic resin (e.g. PMMA), polyester or resin-based coating, for example, fluorocarbon resin, silicone resin, acrylic resin, alkyd resin, polyurethane (PU) resin, epoxy resin, unsaturated polyester resin or mixtures thereof. The protection layer may further have inorganic compound particles added therein, thereby further enhancing the reflectivity of the resultant reflector. Besides, since the inorganic compound particles, for example, titanium dioxide, can also reflect UV irradiation, the UV induced damage to the polymeric substrate can be considerably eliminated, so as to effectively reduce yellowing of the polymeric substrate.

The inorganic compound suitably applied in the present invention may be titanium dioxide, calcium carbonate, barium sulfate, magnesium oxide, zinc oxide or mixtures thereof.

Moreover, the protection layer may further have an anti-UV ingredient added therein, for further eliminating the UV induced damage to the light-reflecting polymeric substrate. The appropriate anti-UV ingredient may be an UV absorbing agent, for example, benzotriazole (BTA), benzophenone, cyanoacrylate, amino-type compound, hindered amino-type compound, salicyl-type compound, nickel complex or mixtures thereof.

As the anti-UV reflector of the present invention applied in the conventional illuminating device, for example, a backlight module of the LCD, the protection layer is not only directly combined with but also directly disposed on the substrate, and it is fixed on the polymeric substrate by using a fixing device (e.g. the joint of the housing) disposed in the illuminating device.

In a process according to another preferred embodiment of the present invention, the aforementioned protection layer may be thermally pressed on the polymeric substrate directly, or adhered on the polymeric substrate via an adhesive layer, so as to produce the anti-UV reflector of the present invention.

In a process according to a still another preferred embodiment of the present invention, the aforementioned protection layer may be extruded from a die of an extruder to form a melting sheet, followed by pressing the melting sheet and the polymeric substrate to be bonded together, so as to produce the anti-UV reflector of the present invention.

In a process according to a further another preferred embodiment of the present invention, the protection layer and the polymeric substrate are subjected to a co-extrusion process, so as to form the anti-UV reflector of the present invention.

In a process according to a further another preferred embodiment of the present invention, the protection layer is coated on the polymeric substrate to be combined together, so as to form the anti-UV reflector of the present invention.

In the aforementioned embodiment, when the substrate is polycarbonate and the protection layer is polypropylene, an acid anhydride may be added in the polypropylene protection layer to enhance polarity thereof, thereby effectively increasing the junction between the polypropylene protection layer and the polycarbonate substrate.

The aforementioned anti-UV reflector may be formed in a manner of hot forming (e.g. thermoforming, vacuumforming and so forth), so as to produce the anti-UV reflector with a desired structure.

Comparative Example 1

Titanium dioxide powders (manufactured by DuPont Co., Model No. R-105) and polycarbonate resin particles (manufactured by Chi Mei Corp., Model No. PC-110, melt flow index of 10 g/10 min@300° C.*1.2 kg, specific gravity of 1.2) are loaded into an extruder and blended uniformly, so as to produce a TiO$_2$-containing polycarbonate master batch (abbreviated to "master batch" thereinafter). Next, the above master batch is loaded into another extruder to extrude a TiO$_2$-containing polycarbonate reflector through a flat die.

Example 1

A polypropylene (PP) sheet (Manufactured by Nanya Plastics Co., Ltd.) and the above TiO$_2$-containing polycarbonate reflector are subjected to a hot pressing procedure to produce an anti-UV reflector.

Example 2

UV absorbing agent (manufactured by CIBA Co., Model No. TINUVIN-234) and PMMA particles (manufactured by Chi Mei Corp., Model No. CM-205, melt flow index of 1.8 g/10 min@230° C.*3.8 kg, specific gravity of 1.9) are loaded into a first extruder and blended uniformly, so as to produce a master batch. Next, the master batch is loaded into a second extruder to extrude an anti-UV reflector through a coextrusion die.

Example 3

The surface of the TiO$_2$-containing polycarbonate reflector is spread with a TiO$_2$-containing PU coating, so as to produce an anti-UV reflector.

Test Results

Individual original reflectivity R$_0$ at 550 nm, shading value, red-green value and yellow-blue value of the resultant products of EXAMPLES 1, 2, 3 and COMPARATIVE EXAMPLE are respectively evaluated by a spectrophotometer (manufactured by DATACOLOR Co., Model No. SF-600). After the anti-UV test is carried out, which is continuously illuminated by a UV lamp with wavelength of 313 nm, at temperature of 70° C. for 100 hours, individual reflectivity change ΔR, shading value change ΔL, red-green value change Δa and yellow-blue value change Δb of those above products are respectively evaluated by the aforementioned spectrophotometer again, and the result is shown in TAB. 1.

Tab. 1

|     | COMPARATIVE EXAMPLE | EXAMPLE 1 | EXAMPLE 2 | EXAMPLE 3 |
| --- | --- | --- | --- | --- |
| R$_0$ | 95.50% | 94.23% | 91.86% | 95.91% |
| ΔR | −4.98% | −0.91% | −0.04% | −0.29% |
| ΔL | −5.69 | −0.42 | −0.03 | −0.20 |
| Δa | −0.43 | −0.19 | −0.21 | −0.24 |
| Δb | 26.77 | 0.82 | 0.49 | 1.07 |

From the result shown in TAB. 1, the yellow-blue value changes Δb (0.82, 0.49 and 1.07) of the resultant products of the anti-UV reflectors of EXAMPLES 1, 2 and 3 are far smaller than the one (26.77) of the resultant products of the anti-UV reflectors of COMPARATIVE EXAMPLE. Since the positive value indicates that the color turns to deep yellowness after illuminated by UV, the resultant products of the anti-UV reflectors of EXAMPLES 1, 2 and 3 are resistant to yellowing. In addition, the reflectivity changes ΔR (−0.91%, −0.04% and −0.29%) of the resultant products of the anti-UV reflectors of EXAMPLES 1, 2 and 3 are also far smaller than the one (−4.98%) of the resultant products of the anti-UV reflectors of COMPARATIVE EXAMPLE. Therefore, the result of TAB. 1 demonstrates that the resultant products of the anti-UV reflectors of EXAMPLES 1, 2 and 3 can be virtually resistant to UV irradiation.

As is understood by a person skilled in the art, the foregoing preferred embodiments of the present invention are illustrated of the present invention rather than limiting of the present invention. It is intended to cover various modifications and similar arrangements included within the spirit and scope of the appended claims. Therefore, the scope of which should be accorded the broadest interpretation so as to encompass all such modifications and similar structure.

What is claimed is:

1. An anti-ultraviolet (anti-UV) reflector, comprising:
    a polymeric substrate, wherein the polymeric substrate is made of polycarbonate and further comprises inorganic compound particles, and the inorganic compound is selected from the group consisted of titanium dioxide, calcium carbonate, barium sulfate, magnesium oxide, zinc oxide and mixtures thereof;
    a polypropylene layer disposed on the polymeric substrate, wherein the polypropylene layer further comprises inorganic compound particles, an anti-UV ingredient, and an acid anhydride; and
    an adhesive layer disposed between the polymeric substrate and the polypropylene layer.

2. The anti-UV reflector according to claim 1, wherein the inorganic compound is selected from the group consisted of titanium dioxide, calcium carbonate, barium sulfate, magnesium oxide, zinc oxide and mixtures thereof.

3. The anti-UV reflector according to claim 1, wherein the anti-UV ingredient is an UV absorbing agent selected from the group consisted of benzotriazole (BTA), benzophenone, cyanoacrylate, amino-type compound, hindered amino-type compound, salicyl-type compound, nickel complex and mixtures thereof.

4. An anti-UV reflector, comprising:
    a polymeric substrate, wherein the polymeric substrate is made of polycarbonate and further comprises inorganic compound particles, and the inorganic compound is selected from the group consisted of titanium dioxide, calcium carbonate, barium sulfate, magnesium oxide, zinc oxide and mixtures thereof, and an acid anhydride; and an acrylic resin layer disposed on the polymeric substrate, wherein the acrylic resin layer further comprises inorganic compound particles and an anti-UV ingredient.

5. The anti-UV reflector according to claim 4, wherein the inorganic compound is selected from the group consisted of titanium dioxide, calcium carbonate, barium sulfate, magnesium oxide, zinc oxide and mixtures thereof.

6. The anti-UV reflector according to claim 4, wherein the anti-UV ingredient is an UV absorbing agent selected from the group consisted of benzotriazole (BTA), benzophenone, cyanoacrylate, amino-type compound, hindered amino-type compound, salicyl-type compound, nickel complex and mixtures thereof.

7. An anti-UV reflector, comprising:
a polymeric substrate, wherein the polymeric substrate is made of polycarbonate and further comprises inorganic compound particles, and the inorganic compound is selected from the group consisted of titanium dioxide, calcium carbonate, barium sulfate, magnesium oxide, zinc oxide and mixtures thereof; and a protection layer disposed on the polymeric substrate, wherein the protection layer is made of a material selected from the group consisted of polyester, coating resin, fluorocarbon resin, silicone resin, acrylic resin, alkyd resin, polyurethane (PU) resin, epoxy resin, unsaturated polyester resin and mixtures thereof, and the protection layer further comprises inorganic compound particles and an anti-UV ingredient.

8. The anti-UV reflector according to claim 7, wherein the inorganic compound is selected from the group consisted of titanium dioxide, calcium carbonate, barium sulfate, magnesium oxide, zinc oxide and mixtures thereof.

9. The anti-UV reflector according to claim 7, wherein the anti-UV ingredient is an UV absorbing agent selected from the group consisted of benzotriazole (BTA), benzophenone, cyanoacrylate, amino-type compound, hindered amino-type compound, salicyl-type compound, nickel complex and mixtures thereof.

* * * * *